Jan. 27, 1953  G. A. BRUNDRETT  2,626,685
SHOCK ABSORBER
Filed Oct. 14, 1950  2 SHEETS—SHEET 1
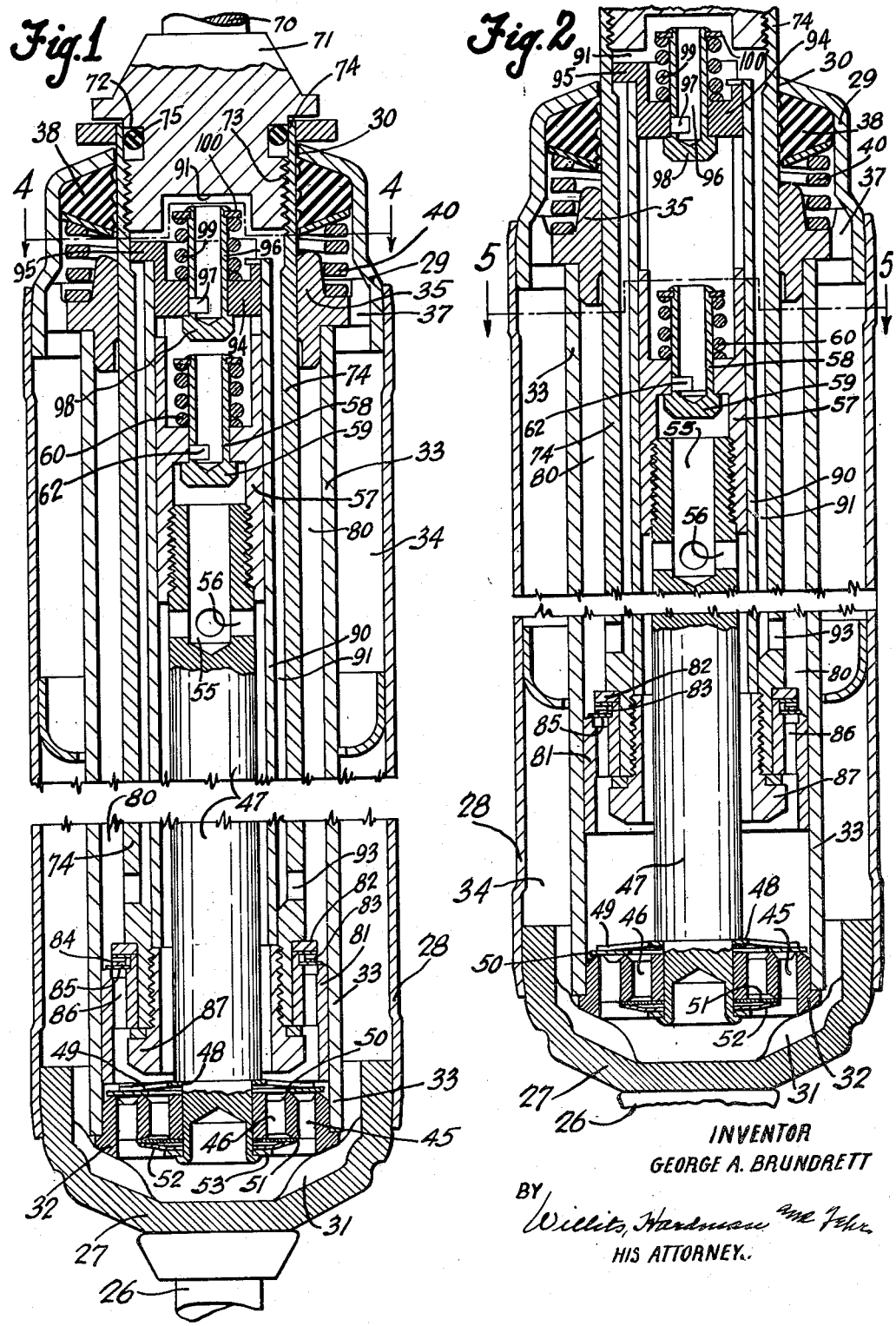
INVENTOR
GEORGE A. BRUNDRETT
BY
Willits, Hardman and Fehr
HIS ATTORNEY.

Jan. 27, 1953 G. A. BRUNDRETT 2,626,685
SHOCK ABSORBER

Filed Oct. 14, 1950 2 SHEETS—SHEET 2

INVENTOR
GEORGE A. BRUNDRETT
BY Willits, Hardman and Fee
HIS ATTORNEYS

Patented Jan. 27, 1953

2,626,685

UNITED STATES PATENT OFFICE 2,626,685

SHOCK ABSORBER

George A. Brundrett, Dayton, Ohio, assignor to General Motors Corporation, Detroit, Mich., a corporation of Delaware Application October 14, 1950, Serial No. 190,083

9 Claims. (Cl. 188—88)

1

This invention relates to an improved double acting hydraulic shock absorber adapted to control the approaching and separating movements of the frame and axle of a vehicle between which the shock absorber is connected.

To have an hydraulic shock absorber operate at full efficiency, so that immediate and positive control is provided it is necessary that fluid, substantially without air content be provided in the fluid displacement chambers and that the chamber in which pressure is to be exerted upon its fluid content be completely filled.

It is among the objects of the present invention to provide a double acting hydraulic shock absorber in which the fluid displacement chamber, being filled with fluid during the stroke of the shock absorber in one direction, has said fluid injected thereinto under pressure, whereby the chamber is completely filled and supercharged with a substantially air free fluid preparatory to having pressure exerted thereupon during the next stroke of the shock absorber in the opposite direction.

This object is accomplished by forcing fluid, under pressure from a larger contracting chamber into a smaller expanding chamber and by providing a fluid discharge means operative to restrict the transfer of the excess fluid into another chamber acting as a receiving chamber.

Further objects and advantages of the present invention will be apparent from the following description reference being had to the accompanying drawings wherein a preferred embodiment of the present invention is clearly shown.

In the drawings:

Fig. 1 is a longitudinal sectional view of the fully contracted shock absorber.

Fig. 2 is a view similar to Fig. 1 showing the shock absorber partially expanded.

2

Figure 3:
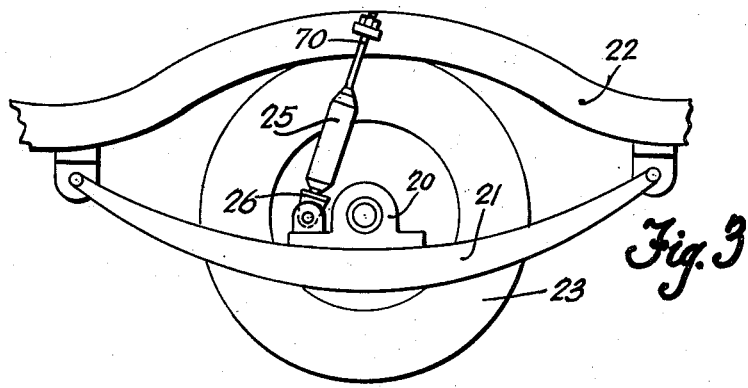
Fig. 3 is a diagrammatic view showing the shock absorber applied to a motor vehicle between the rear axle and the frame thereof applied to a motor vehicle between the rear axle and the frame thereof.
Figure 4:
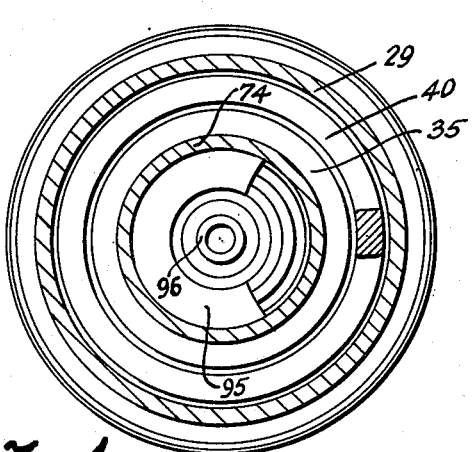
Fig. 4 is a transverse sectional view taken substantially along the line and in the direction of the arrows 4—4 of Fig. 1.
Figure 5:
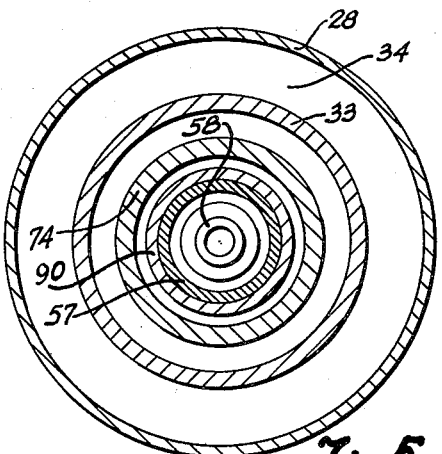
Fig. 5 is a view similar to Fig. 4 but taken along the line and in the direction of the arrows 5—5 of Fig. 2.

Referring to the drawings and particularly the Fig. 3 which diagrammatically shows the shock absorber of the present invention applied to a motor vehicle, the numeral 20 designates the axle of the vehicle attached to a vehicle spring 21 the ends of which are hingedly secured to the vehicle frame 22. The axle has the wheel 23 of the vehicle applied thereto. The hydraulic shock absorber designated as a whole by the numeral 25 comprises two relatively movable portions or groups of parts one being attached to the axle 20, the other to the frame 22 of the vehicle. When an obstruction in the roadway is met by the vehicle wheel 23 the axle 20 is thrust upwardly to approach the frame 22 thereby placing the spring 21 of the vehicle under compression. This approaching movement of the axle 20 toward the frame 22 moves the associated parts of the shock absorber 25 relatively to the associated parts of the shock absorber connected to the frame 22 and thus the shock absorber 25 is contracted. For purposes of this description the contractive movement of the shock absorber is referred to as its "compression stroke" for during this time the vehicle spring 21 is placed under compression. The reaction to this compression of the spring 21 is to cause the frame 22 to be thrust upwardly thereby resulting in a separating movement of the frame and axle of the vehicle. This separating movement results in an expanding of the shock absorber 25 due to the relative separating movements of the portions of the shock absorber attached to the axle and to the frame of the vehicle respectively. In this movement of the shock absorber it is referred to as its "rebound movement" resulting from the rebounding of the compressed vehicle spring 21 toward its normal load position after having been moved on its compression stroke by the striking of an obstruction in the roadway.

To simplify the description and for purposes of facilitating a clear understanding thereof the parts of the shock absorber attached and movable directly with the axle 20 of the vehicle will be described. With reference particularly to the Figs. 1 and 2 the stub shaft 26 is attachable to the axle in any suitable manner. To this stub shaft there is secured in any suitable way a cup-shaped member 27 which forms an end closure cap for the outer tubular member 28 of the shock absorber. The upper or opposite end of this tubular member 28 has the inverted cup-shaped element 29 attached thereto in any suitable manner, the cup 29 being provided with a central opening 30 for purposes to be described. The lower closure member or cup 27 has internal spaced ribs 31 upon which a valve cage 32 rests. This valve cage fits into and supports the one end of a tube 33 smaller in diameter than the outer tube 28 so as to provide an annular space between said two tubes which forms the fluid reservoir 34. The upper or opposite end of the tube 33 has a closure member 35 fitting into and upon it, this closure member being centrally apertured for purposes to be described and having an outwardly extending annular flange which fits into the portion of the upper closure member or cap 29, the body portion of the closure member extending telescopically into the outer tube 28. A plurality of notches 37 in the peripheral edge of the annular flange provides communication between the reservoir 34 and the space above said flange and inside the closure cup 29. A resilient package 38 is provided within the inverted closure cup 29 being urged into sealing engagement with the closure member and with the tube slidably supported in the central opening of closure member 35 which tubes extends through the central opening 39 in the closure member 29. The spring 40 interposed between the flange of the closure member 35 and an abutment washer on the resilient packing 38 exerts a constant force upon the packing to keep it in sealing engagement as mentioned.

Figure 8:
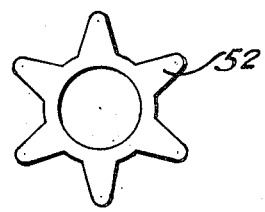
Fig. 8 is a detail view of the spring member of another of the fluid flow control valves.

The valve cage 32 resting and urged upon the ribs 31 in the closure member 27 partially telescopically fits into the tube 33 which forms the one working cylinder of the shock absorber. This valve cage has a plurality of through passages one group designated by the numeral 45 being arranged in a circular row, the other group 46 also being arranged in a circular row within the group 45. The valve cage 32 has a rod 47 centrally secured thereto in any suitable manner said rod being concentric with the working cylinder 33. An annular shoulder on rod 47 provides an abutment for the ring shaped body portion 48 of a spring, the resilient fingers 49 of which engage and yieldably urge the ring disc valve 50 upon the valve cage 32 to close the group of openings 45 in said valve cage. This valve 50 will permit fluid to flow from the chamber beneath the valve cage, which chamber is in communication with the reservoir 34, into the working cylinder 33, but will not permit fluid to flow from said cylinder into the reservoir. The openings 46 in the inner annular row are normally closed by a disc valve 51 yieldably urged against the valve cage 32 by a star shaped spring 52, detailedly shown in Fig. 8 and supported upon an abutment washer 53 secured to the rod 47. Valve 51 is operative to permit fluid to flow from cylinder 33 into the reservoir 34 under certain conditions but will not permit fluid to flow in the opposite direction from the reservoir 34 into the cylinder 33. For purposes of this description the valve 50 will be referred to as the "intake valve" while valve 51 will be termed a "fluid flow restricting valve."

The rod 47, carried by the valve cage 32 and extending coaxially into the cylinder 33, has a longitudinally central passage 55 extending from the inner end of the rod to a series of radial or cross-passages 56. The inner end of this rod 47 is screw threaded to receive the interiorly threaded end of a tubular piston 57. This piston 57 has an inner partition spaced from the end of rod 47 when the piston is attached to said rod, this partition being provided with a central through passage in which the valve 58 is sldiably carried. This valve 58 has a tubular shaped body portion provided with an enlarged solid head 59 which is yieldably maintained upon the inner surface of the partition to close the passage therein by a coil spring 60 one end of which rests upon the upper surface of the partition in the piston the other end abutting upon a washer secured to the outer end of the tubular body portion of the valve. A slide slot 62 in the tubular body portion of the valve 58, is normally within the confines of the central passage in the partition of piston 57, said side slot however being effective to provide communication between the interior of the tubular body portion of the valve 58 and the passage 55 in the rod 47, when pressure actuates the valve 58 against the effect of spring 60 to move the head 59 of said valve out of engagement with the surface of the partition in piston 57. As shown in Figs. 1 and 2 the annular wall of the piston 57 extends beyond the end of said valve 58. The elements aforedescribed are those which, assembled together, are secured to the axle 20 of the vehicle and move therewith.

Now the elements of the shock absorber assembled together and attached to and movable with the frame 22 of the vehicle will be described.

Figure 6:
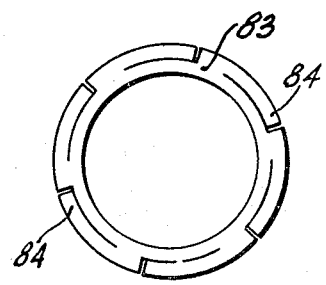
Fig. 6 is a detail view of the spring member of one of the fluid flow control valves.
Figure 7:
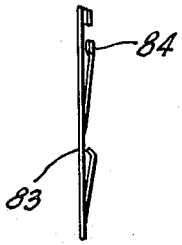
Fig. 7 is a side view of the spring shown in Fig. 6.

The rod 70 is attached to the frame of the vehicle 22 in any suitable manner. This rod 70 has a plug 71 formed or secured thereon, said plug having a body portion provided with an annular groove 72 and is exteriorly threaded beneath said groove as at 73. The screw threaded end 73 of the plug 71 has the one end of a tube 74 threadedly secured thereto, the tube extending over and closing the annular groove 72 in the plug. To provide a seal at this point, this closed groove 72 contains any suitable resilient packing ring 75. The tube 74, threadedly attached to the block 71 as just described, extends through the central opening 30 in the upper closure cap 29 and is sealingly engaged by the packing 38 in said closure cap and is slidably supported with the central opening of the closure member 35. This tube extends coaxially into and through the tube 33 and being of smaller diameter than the inner diameter of the tube 33, forms the annular space 80, which may be termed the "rebound compression chamber." This tube 74 has a reduced outer diameter portion at its lower end upon which the second piston 81 of the shock absorber is mounted. The shoulder provided by the reduced diameter portion on tube 74 forms an abutment for the ring 82 which supports a valve controlling spring 83 detailedly shown in the Figs. 6 and 7. This spring has a solid annular ring portion fitting about the smaller diameter portion of tube 74 and abutting against the ring 82. The ring-shaped portion of this spring has resilient tongues 84 struck therefrom which are shaped to engage the ring shaped valve 85 and yieldably urge it upon the upper surface of the piston 81. This piston has a plurality of passages 86, the upper ends of which are normally covered by the ring shaped valve 85, the lower ends of which open into and communicate with the space beneath the piston 81 and between said piston 81 and the valve cage assembly 32 at the bottom end of cylinder 33. The lower end of tube 74 is interiorly threaded to receive the sleeve-shaped clamping nut 87 which presses and holds the piston 81 rigidly upon the rod 74 so that any movement of the rod 74 up or down through its slidably supporting guide provided by the closure member 35 will likewise move the piston 81 within the cylinder 33.

A second cylinder 90 has its one end resting upon the inner, annular end of the ring shaped clamping nut 87. This cylinder 90 has an outside diameter less than the inside diameter of the tube 74 whereby an annular space 91 is formed between the cylinder 90 and the tube 74. This annular space 91 is in constant communication with the rebound control chamber 80 by openings 93 provided in the tube 74 adjacent the abutment ring 82 clamped upon said tube. Thus the rebound compression or control chamber 80 constantly communicates with and really has the annular space 91 forming a part thereof. The upper end of cylinder 90 has an apertured closure member 94, a portion of which telescopically fits into the upper end of the cylinder 90, another portion being in the form of an annular flange 95 fitting into the tube 74 and having a portion thereof cut away so as to provide communication between the space 91 beneath the block 71 and the central orifice in the closure member 94. This central orifice in the closure member 94 forms a sliding seat for the valve 96 which is similar to the valve 58. This valve 96 has a tubular body portion provided with a side opening 97 and an enlarged solid head portion 98, the head portion being maintained in engagement with the inner surface of the closure member 94 to close it and the side openings 97 in the tubular body portion of valve 96, by a spring 99. This spring surrounds the valve body portion, one end of the spring engaging the upper surface of the closure member 94, the other end an abutment washer 100 secured to the body portion of valve 96 in any suitable manner.

From the aforegoing it will be seen that the piston 57 carried by and secured to the rod 47 reciprocates within the cylinder 90. The chamber within the cylinder between piston 57 and the closure member 94 of the cylinder 90 may be termed the "compression control chamber." The chamber beneath piston 57, comprising the space between valve head 59 and the end of the rod 47 together with the passage 55, the connecting cross-passages 56 and the annular space between the rod 47 and the interior of the cylinder 90 is in constant communication with the chamber beneath the piston 81 and more particularly between piston 81 and the valve assembly in valve cage 32.

Operation of the shock absorber

Normally the relatively movable parts of the shock absorber are in a position in which the piston 81 is substantially midway between the closure member 35 at the top end of the cylinder 33 and the valve assembly in cage 32 at the bottom or opposite end of said cylinder 33. Assuming that the vehicle wheel 23 strikes an obstruction in the surface it is being operated over, the road wheel 23 will be thrust upwardly to the frame 22 putting the vehicle springs 21 under compression, moving the axle 20 toward the frame 22 which results in a contraction of the shock absorber or more specifically a movement of the piston 81 downwardly in cylinder 33 toward the valve asembly in cage 32. This upward thrust of the axle 20 also causes a movement of the piston 57 upwardly in the cylinder 90 toward the closure member 94 thereof. As the piston 57 moves toward the closure member 94 pressure will be exerted upon the fluid within the compression control chamber between piston 57 and closure member 94 which will cause the valve 58 to be actuated moving its head 59 from engagement with the partion in piston 57 and thus the side openings in valve 58 will be moved out of the confines of the central opening in said partition thereby establishing a restricted fluid flow from the compression control chamber above the piston 57 through the valve 58 and its now open side passages 62, into the chamber beneath the piston, the fluid being urged through the passages 55 and 56 into the annular space between rod 47 and cylinder 90, into the chamber beneath the piston 81 with which it is in constant communication. At the same time piston 81 moving downwardly to exert a pressure upon the fluid in the chamber beneath it, causes the valve 85 to open passages 86 in said piston thereby permitting fluid flow from the chamber beneath piston 81 through passages 86 into the rebound chamber 80 above said piston. The rebound control chamber 80 which also includes the annular space 91 due to the cross openings 93 in tube 74 is closed at its upper end by the valve 96. This rebound control chamber is of such a fluid capacity as to be unable to receive all of the fluid being displaced in the chamber beneath piston 81 by the downward movement of said piston. Thus the valve 51 in response to pressure within the chamber beneath piston 81, valve 51 requiring a greater fluid pressure to open it than valve 85, will be operated to establish a flow of fluid from the chamber beneath piston 81, through passages 46 in the valve cage 32, into the communicating fluid reservoir 34 to permit the excess fluid not receivable by the rebound control chamber 80 to be directed and transferred to said fluid reservoir 34. The fluid being forced into the rebound control chamber 80, under pressure, will cause the entire rebound control chamber to be completely filled. Any air contained in the fluid beneath the piston 81 will be forced along with the fluid passing through passages 46 into the reservoir 31. The restriction of the fluid flow from the compression control chamber between piston 57 and closure member 94, provided by the valve 58, resists this compression movement of the entire shock absorber and therefore the movement of the axle 20 toward the frame 22 is substantially resisted and cushioned. This thrust upwardly of the axle 20 to the frame 22 will naturally tend to move said frame 22 upwardly to a certain degree and, when the road wheel 23 has passed over the obstruction or bump, the spring 21 of the vehicle will rebound to the normal load position resulting in a separating movement between the axle 20 and the frame 22 of the vehicle.

The rebound or separating movement of the axle 20 away from frame 22 causes the shock absorber to be actuated on its rebound stroke. Now the movements of the relatively movable parts of the shock absorber are reversed from that heretofore described. The piston 81 will be moved upwardly in its cylinder 33 and the piston 57 will be moved downwardly in its cylinder 90 or away from the closure member 94 of said cylinder. As the piston 81 moves upwardly in the cylinder 33, the fluid in the rebound control chamber 80 above piston 81, said chamber having been supercharged by the previous shock absorber stroke in the opposite direction, will be forced from the rebound control chamber 80 and its side passages 93 and annular space 91, against the valve 96, actuating said valve against the effect of spring 99 to move the head 98 out of engagement with the inner surface of the closure member 94 and thus move the side passages or openings 97 in the body of valve 96 out of the confines of the opening in the closure member 94 supporting the valve 96. This establishes a restricted fluid flow through valve 96 out of its side opening 97 into the now expanding chamber between the piston 57 and the closure member 94 of cylinder 90. The restriction to this fluid flow provided by valve 96 causes the shock absorber to offer a resistance to the separating movement of the axle 20 and the frame 22 of the vehicle. Inasmuch as the expanding chamber between piston 57 and the closure member 94 is of lesser fluid capacity than the rebound control chamber 80 and its associated space 91, it cannot receive all of the fluid being forced from the said larger supercharged rebound control chambers 80, 93, 91. The excess fluid transferred into the chamber above piston 57 under pressure, will be permitted to leak past the valve 58 which is opened for this purpose by the fluid pressure in the fluid compression chamber, this fluid leakage through valve 58 its side openings 62 into the chamber beneath the piston 57 and through passages 55 and 56 in the rod passing downwardly through the annular space between said rod 47 and the rod 90 into the now expanding chamber beneath the piston 81. Inasmuch as fluid is forced from the previously supercharged rebound control chamber into the compression control chamber during this movement of the shock absorber and the excess fluid flowing into the compression control chamber under pressure is permitted to leak restrictively therefrom past the valve which opens under these circumstances, this compression control chamber between piston 57 and the closure member 94 will be supercharged during this rebound stroke preparatory to the next reverse or compression stroke.

The fluid discharge from the compression control chamber past valve 58 during this movement of the shock absorber is insufficient to provide the proper fluid supply for the chamber beneath poston 81 and thus in response to the upward movement of piston 81 during this rebound stroke, valve 50 will be opened against the effect of spring fingers 49 to establish a replenishing flow of fluid from the reservoir through passages 45 into the chamber beneath piston 81 and thus provide the proper fluid supply therefor.

From the aforegoing, it will be seen that the present shock absorber is completely supercharged, that is, each fluid displacement chamber does active work on one stroke at full efficiency and is supercharged during the other stroke. Fluid forced into the one chamber under pressure while the other chamber is active will fill said one chamber completely and with substantially air free fluid, thereby providing an incompressible medium in said chamber which immediately upon reverse movement of the shock absorber to render the supercharged chamber active, will provide full control, the complete filling of the chamber with substantially air free fluid completely eliminating the lagging and spongy resulting effort provided by the shock absorber when a controlling chamber is only partially filled with fluid which contains an undesirable amount of compressible air.

While the embodiment of the present invention as herein disclosed, constitutes a preferred form, it is to be understood that other forms might be adopted.

What is claimed is as follows:

1. A double acting hydraulic shock absorber of the direct acting type adapted to control the approaching and separating movements of two relatively movable members between which the shock absorber is connected, comprising in combination, a fluid reservoir; two cylinders each having a piston therein forming two fluid displacement chambers in each cylinder, the two chambers beneath the respective pistons being in constant communication, the two chambers above the respective pistons having a one-way valve interposed therebetween; a spring loaded valve in the one piston normally shutting off communication between the chambers on opposite sides of said one piston, said valve being operative at a predetermined fluid pressure in the chamber above said one piston to establish a restricted fluid flow through the piston into the chamber beneath said one piston, a second spring loaded valve in the second piston, normally shutting off communication between the chambers above and beneath said second piston, said second valve being operative to establish a fluid flow from the chamber beneath into the chamber above said second piston, both piston valves being rendered active to establish their respective fluid flows in response to actuation of the shock absorber by the approaching movement of the two relatively movable members; fluid flow control means operative at a predetermined greater fluid pressure than necessary to open the valve in the said second piston, for establishing a fluid flow from the chamber beneath the both pistons into the reservoir; said one-way valve being operative at a predetermined pressure within the chamber above the second piston, resulting from the movement of said second piston by separating movement of the two relatively movable members, to establish a restricted fluid flow from said chamber above the second piston into the chamber above the said one piston, the valve in said one piston being opened to establish a fluid leak from the chamber above said one piston caused by the differential fluid capacity of the two chambers above said pistons; and a valve between the reservoir and chamber beneath the pistons, operative to establish fluid flow from the reservoir into the last mentioned chamber as the second piston is moved to increase the capacity of this chamber due to separation of the two relatively movable members.

2. A double acting hydraulic shock absorber of the direct acting type adapted to control the approaching and separating movements of two relatively movable members between which the shock absorber is connected, comprising in combination, a fluid reservoir; relatively movable cylinders and pistons providing a plurality of fluid displacement chambers, above and below said pistons, the two chambers beneath the pistons being in constant communication and communicable with the fluid reservoir; five fluid flow control valves in the shock absorber, the first being interposed between the chambers at opposite sides of the first piston, the second valve between the chambers at opposite sides of the second piston, both valves being concurrently operative by actuation of the shock absorber as the two relatively movable members approach each other, the first valve being operative to establish a shock absorber movement resisting fluid flow from the chamber above the first piston into the chamber beneath it, the second valve operative to establish a fluid flow from the chamber beneath the second piston into the chamber above it, the third valve, interposed between the chambers beneath both pistons and the reservoir being operative at a fluid pressure higher than that necessary to open the second valve, for establishing a fluid flow into the reservoir as the shock absorber is actuated by the approaching movement of the two relatively movable members, the fourth valve, interposed between the two chambers above the two pistons, being operative in response to fluid pressure in the chamber above the second piston, as the shock absorber is actuated by the separation of the two relatively movable members, to establish a shock absorber movement resisting flow from the chamber above the second piston into the chamber above the first piston, a fluid leak from said last mentioned chamber being established by the first valve due to the smaller fluid capacity of the chamber above the first piston, the fifth valve provided between the chambers beneath both pistons and the reservoir being operative in response to the shock absorber actuation by the separating movable members, to establish a flow from the reservoir into the two chambers beneath the pistons.

3. A double acting hydraulic shock absorber connected between the frame and axle of a vehicle for controlling the approaching and separating movement thereof, said shock absorber comprising, a fluid reservoir; two cylinders, one within the other, each cylinder having a piston which forms an upper and a lower fluid displacement chamber therein, the two lower chambers of the respective cylinders being in constant communication, the two upper chambers being in communication with each other only through a pressure relief valve which is operative to establish a shock absorber movement resisting restricted flow of fluid from the upper chamber of the larger cylinder into the upper chamber of the smaller cylinder as the shock absorber is actuated by the separating movement of the frame and axle; and a fluid flow restricting valve in the piston of the smaller cylinder, operative to perform two functions, the first, to establish a restricted outlet for the excess fluid transferred from the larger into the smaller upper chamber during said separating movement of the frame and axle of the vehicle, whereby said smaller upper chamber is supercharged with fluid preparatory to the reverse operation of the shock absorber, the second function of this valve being to establish a shock absorber movement resisting, restricted fluid flow from said supercharged smaller upper chamber as the shock absorber is actuated by the approaching frame and axle movement.

4. A shock absorber in accordance with claim 3, in which, however, a valve is interposed between the fluid reservoir and the lower chambers beneath the two pistons, said valve being operative to establish a flow of fluid from the reservoir into said two lower chambers in response to the movement of the shock absorber by the separating action of the frame and axle of the vehicle.

5. A double acting hydraulic shock absorber connected between the frame and axle of a vehicle for controlling the approaching and separating movements thereof, said shock absorber comprising, a fluid reservoir; two cylinders, one within the other, each cylinder having a piston which forms an upper and a lower fluid displacement chamber therein, the two lower chambers of the respective cylinders being in constant communication; a valve in the piston within the inner and smaller diameter cylinder said valve being operative as the shock absorber is actuated by the frame and axle of the vehicle as they approach each other, to establish a shock absorber movement resisting, restricted fluid flow from the chamber above said smaller piston into the chamber therebeneath and its communicating chamber beneath the larger piston; a valve in the larger piston operative at a predetermined fluid pressure in the chamber beneath the larger piston to establish a flow of fluid from said chamber beneath into the chamber above said larger piston; and a valve interposed between the said chamber beneath the piston and the reservoir, this valve being operative at a higher pressure than that which opens the valve in the larger piston for establishing the transfer of fluid from the chamber beneath the piston into the reservoir whereby the chamber above the larger piston is supercharged and fluid not receivable by the last mentioned chamber is transferred to the reservoir during the actuation of the shock absorber by the frame and axle moving to approach each other.

6. A double acting hydraulic shock absorber connected between two relatively movable members for controlling their approaching and separating movements, the portion of the shock absorber connectible to one of said members comprising, two tubes of different diameters, one within the other and held concentric by a closure at each end of the tubes, the outer tube cooperating with the inner tube, which forms one working cylinder, to provide a fluid reservoir, a valve cage in the cylinder end adjacent the movable member to which said cylinder is attached, said valve cage having a plurality of passages certain of which are normally closed by a pressure relief valve operative only to permit fluid to flow from the cylinder into the reservoir, the others being normally closed by an intake valve operative only to permit fluid to flow from the reservoir into the cylinder, said valve supporting a rod extending centrally into the cylinder said rod providing one piston of the shock absorber, said piston having a passage normally closed by a spring loaded valve operative to establish a fluid flow through the piston and rod only in the direction toward the valve cage, the other portion of the shock absorber connectible to the other of said relatively movable members comprising a tube slidably supported by the closure of the aforementioned cylinder which is larger in diameter than said tube, a piston, the second of the shock absorber, secured to said tube and slidable in said cylinder said second piston being provided with a valve operative only to permit fluid to flow from the chamber between said second piston and the valve cage into the cylinder chamber on the opposite side of said second piston, a tube smaller in diameter than and supported within the tube carrying the second piston, this smaller tube forming the second cylinder in which the said one piston reciprocates, the space between the second cylinder and its surrounding tube being in constant communication with the space between said tube and the said one working cylinder, the end of said second cylinder opposite that supported by the second piston having a closure member provided with a valve operative to establish a restricted fluid flow from the said one working cylinder into the second cylinder.

7. A double acting hydraulic shock absorber connected between the frame and axle of a vehicle for controlling the approaching and separating movements thereof, said shock absorber comprising a fluid reservoir, two working cylinders, one larger in diameter than the other, each having a piston forming fluid displacement chambers therein, a fluid flow control valve in each piston, the valve in the one piston restricting fluid flow through said one piston in one direction as said one piston moves in either direction and the valve in the second piston permitting the transfer of fluid from one side thereof to the other in response to movement of said second piston in one direction only, and a spring loaded valve between the cylinder containing the second piston and the reservoir providing for the restricted transfer of fluid from said last mentioned cylinder into the reservoir in response to actuation of the shock absorber by the frame and axle when approaching each other, said restricted transfer of fluid causing the shock absorber to resist this frame and axle movement and the fluid receiving chamber on the one side of the second piston to be supercharged with fluid preparatory to the reverse shock absorber movement.

8. A shock absorber in accordance with claim 7 in which, however, the displacement chamber on the one side of the said one piston is in fluid receiving communication with the fluid discharging, supercharged chamber on the one side of the second piston through a fluid flow restricting control valve as the shock absorber is actuated by the frame and axle of the vehicle moving to separate, this restricted fluid flow causing the shock absorber to resist such frame and axle movements, the valve in the said one piston being operative to provide a fluid leak for the excess fluid entering the smaller diameter receiving chamber from the larger diameter supercharged chamber, whereby the smaller chamber is supercharged, and a fluid intake valve interposed between the reservoir and cylinders, operative to establish a replenishing fluid flow from the reservoir into the cylinders in response to this actuation of the shock absorber.

9. A double acting hydraulic shock absorber of the direct acting type in which relatively movable portions are telescopically actuated toward each other on the compression stroke and away from each other on the rebound stroke of the shock absorber which comprises in combination a fluid reservoir; two cylinders; a piston in each cylinder dividing it into two working chambers, the two chambers beneath the respective pistons being in communication with each other and the two chambers above the respective piston also being in communication with each other; a two way valve mechanism interposed between the lower cylinder chambers and the reservoir said mechanism consisting of an intake valve operative to permit fluid to flow from the reservoir into said lower chambers in response to movement of the one piston away from said mechanism and a pressure relief valve operative to permit fluid flow from said lower chambers into the reservoir in response to movement of said one piston on its movement toward said valve mechanism; a valve in said one piston operative to permit flow of fluid from the chamber beneath the piston into the chamber above it as this piston moves on its stroke toward said valve mechanism said piston valve opening at a predeterminately lower pressure than the pressure relief valve in the valve mechanism; a spring loaded relief valve interposed between the two chambers above the respective pistons said valve being operative to permit a restricted fluid flow from the chamber above the aforesaid valved piston into the chamber above the other piston, the latter chamber being of predeterminately lesser capacity than the chamber above the valve piston; and a spring compression relief loaded valve, in said other piston operative to establish a restricted fluid flow from the chamber above it into the lower chamber as the shock absorber is actuated on its compression stroke, said compression relief valve being operative also to establish a flow from the chamber above the piston carrying said valve, during the rebound stroke of the shock absorber.

GEORGE A. BRUNDRETT.

REFERENCES CITED

The following references are of record in the file of this patent:

UNITED STATES PATENTS

| Number | Name | Date |
|---|---|---|
| 2,500,708 | Rossman | Mar. 14, 1950 |
| 2,519,605 | Rossman | Aug. 23, 1950 |